Nov. 10, 1964 A. C. FLEURY 3,156,439
MANUALLY OPERATED LANDING GEAR FOR LIGHT
AMPHIBIOUS AIRPLANES
Filed Aug. 27, 1962 4 Sheets-Sheet 1

ALEXANDER C. FLEURY
*INVENTOR.*

BY
*Clarence M. Tuck*

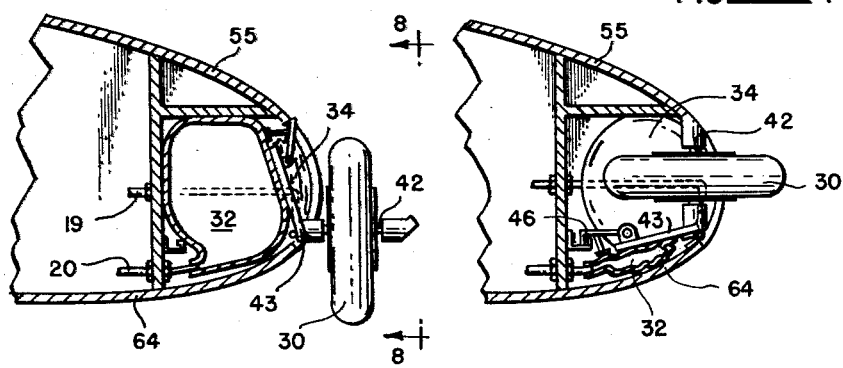
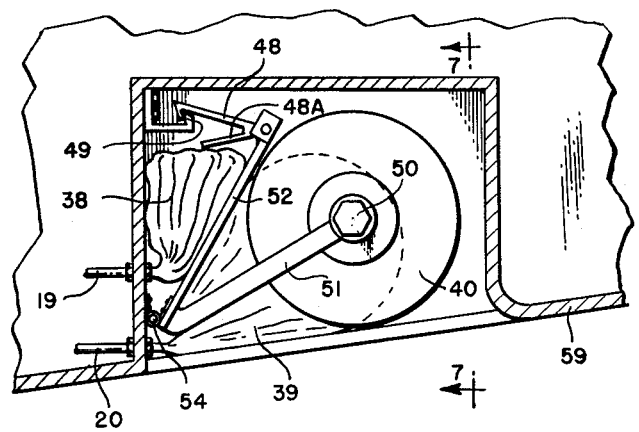
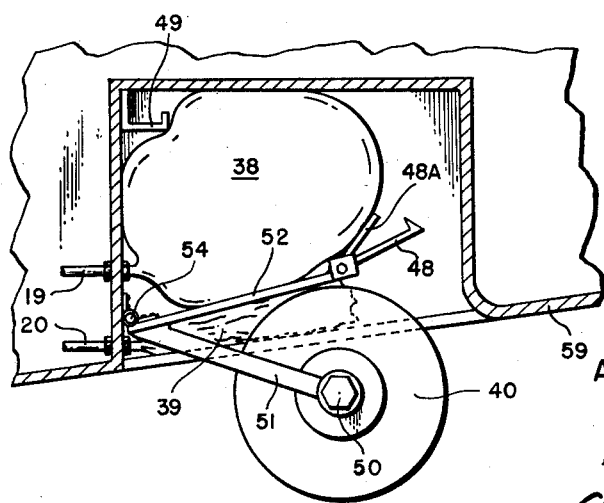

ALEXANDER C. FLEURY
*INVENTOR.*

BY Clarence M. Tuck

Nov. 10, 1964 A. C. FLEURY 3,156,439
MANUALLY OPERATED LANDING GEAR FOR LIGHT
AMPHIBIOUS AIRPLANES
Filed Aug. 27, 1962 4 Sheets-Sheet 4

ALEXANDER C. FLEURY
*INVENTOR.*

BY
*Clarence M. Tuck*

United States Patent Office 3,156,439
Patented Nov. 10, 1964

3,156,439
MANUALLY OPERATED LANDING GEAR FOR LIGHT AMPHIBIOUS AIRPLANES
Alexander C. Fleury, 8200 Wallingford Ave., Seattle 3, Wash.
Filed Aug. 27, 1962, Ser. No. 219,665
13 Claims. (Cl. 244—102)

This present application relates to the general field of amphibious airplanes and more particularly to the type of airplane which is characterized by lightweight and simple construction. More especially this invention relates to wheeled landing gear means having two air bladders per wheel, one of which when filled serves to retract the wheel to its "up" position and the other of which extends the wheel to its "down" position. In this way the shock incidental to earth landings is absorbed.

The continued advancement in airplane construction had led to the production of planes which embody many technological developments which add to the safety, speed and general usefulness of the planes. These planes however, due to their increased complexity, require the skill of professional airplane builders together with factory facilities that become very expensive. The result of the production of planes capable of unusual performance has resulted in a greatly increased cost of small planes for the flier's personal use. It is to overcome these unfortunate results and to provide means whereby a person of reasonable skill and sufficient interest can build and operate his own airplane that this invention has been developed. To reduce the cost of airplane construction, the design must be of simplified form or of light weight so that landing gear is easily retractable and so that the resilient means for absorbing the shock can itself be very simple. In working out these requirements I find that it is possible to build a relatively inexpensive light amphibious plane which serves in a dual capacity so that it may land or take off from either land or water. In my present lightweight amphibious airplane I find it possible to employ a retractable wheel landing means which can be positively positioned and maintained in a resilient position by solely hand operated means and in which the bulk of the components used can generally be hand made by the builder of the plane at reasonable cost.

A principal object of this present invention therefore is to provide an amphibious airplane mechanism in which the wheeled landing means is resiliently backed by a relatively large volume of air contained in a lightweight bag or bladder which also serves as landing shock absorbing means, in addition to serving as the positioning means for the landing gear itself.

A further object of this invention is to provide a hand operated means for supplying a relatively large volume of low pressure air to the various resilient containers employed and which containers are alternatively single action only requiring a return means of a resilient character which may be supplied either by shock cord or by coil springs.

A further object of this invention is to arrange a simple means for employing a plurality of bladders which can be operated first to place the wheels in operational position for landing and wherein separate resilient air containers are employed to definitely retract the wheels into their flying position.

A further object is to provide a means for manually compressing a relatively large volume of low pressure air in collapsible containers and to provide manual control means so adjustable that the air containers can be used to support the weight of the plane and to position the wheels for landing, to absorb the shock of landing and further, with a simple changing of the valving, to provide means for the retraction of the wheels into their flying position.

A further object of this invention is to provide means wherein an accumulator may be employed to store air which may be compressed under pressures somewhat higher than are required for normal use and to have this arrangement such that the air can be compressed by manual or mechanical means, while the plane is in flight. Further, it is desirable to have available a supply of low pressure air so that there will be sufficient on hand for limited maneuvering of the landing gear without it being necessary for the pilot to operate the air compression means, particularly during a landing.

Of course it is intended that this manual pump means of extending and/or retracting the gear will be accomplished with a reasonable number of strokes of the pump, comparable in operating ease with a manually operated hydraulic system, this to be accomplished even without the benefit of the noted stored air.

In the drawings:

FIGURE 3 is a fragmentary cross-sectional view taken substantially along the line 4—4 of FIGURE 1 but showing the wheel in its operational landing position.

FIGURE 4 is a view similar to FIGURE 3 of the same general installation and a true section along the line 4—4 of FIGURE 1, showing the wheel in its flying position.

FIGURE 5 is a view taken in a vertical longitudinal plane through the rear or main landing wheel with the same shown in its retracted or flying position.

FIGURE 6 is a view similar to FIGURE 5 but showing the same mechanism in the positions assumed during the earth landing or take-off.

Referring to the drawings, throughout which like reference characters indicate like parts, FIGURE 1 outlines and illustrates one general type of amphibious airplane employing my simplified landing gear in which two frontal landing wheels and a single, enlarged, rear landing wheel are employed.

Figure 1:
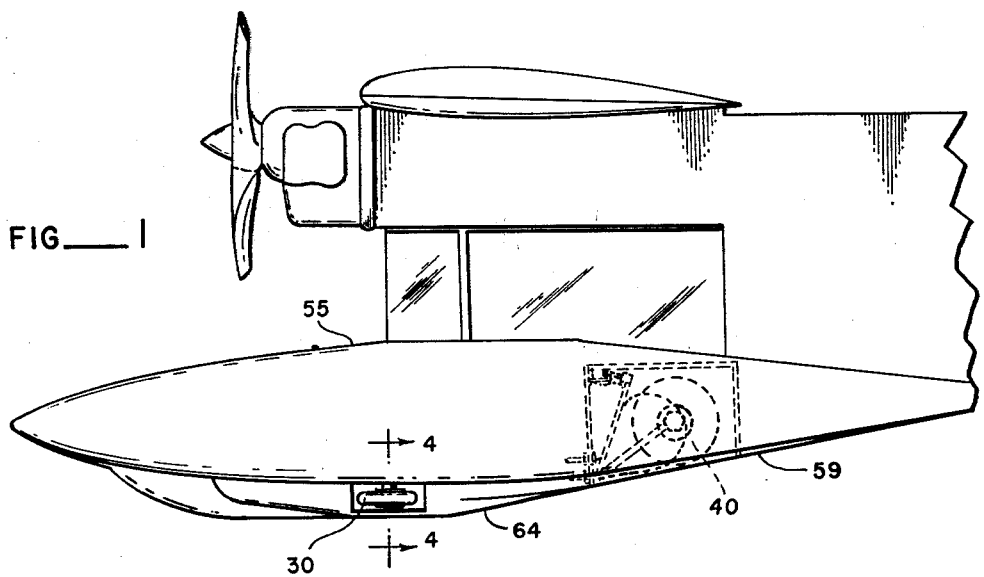
FIGURE 1 is a fragmentary view showing the main or leading portion of an amphibious plane and showing the wheels in their retracted position.
Figure 2:
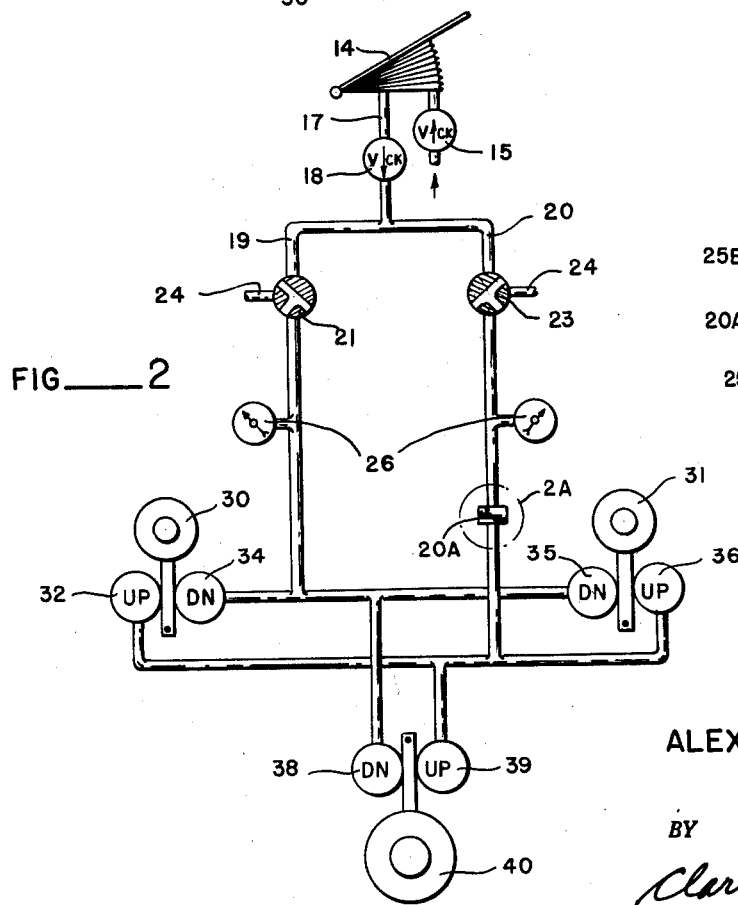
FIGURE 2 is a diagramatic showing of the hand bellows arrangement and of the various bladders and valves required for the general operation of this landing gear equipment.

FIGURE 2 illustrates one exemplary showing of a suitable air supply and control means wherein: 14 designates a hand operated air compressing or pumping means. Air is introduced into the pump or bellows 14 through check valve 15 and discharged through pipe or tube 17. A second check valve 18 retains the air pressure built up in tube 17 and distributed to tubes 19 and 20. Three way valves 21 and 23 permit control of air passing through pipes 19 and 20 as it is possible to close either or both of these pipes or to exhaust either or both to atmosphere through pipes 24. Pressure indicators 26 are preferably provided in pipes 19 and 20 for use in controlling the landing gear by assuring that an adequate air pressure has been built up. It will be noted that pipe 19 supplies air to the bladders 34, 35 and 38 to place wheels 30, 31 and 40 in the landing or extended position. Pipe 20 similarly supplies air to bladders 32, 36 and 39 to move the wheels to the in or retracted position and in many cases to hold them in this position. With this arrangement the three-way valves 21 and 23 direct the air provided by bellows or pump 14 as desired.

Figure 7:
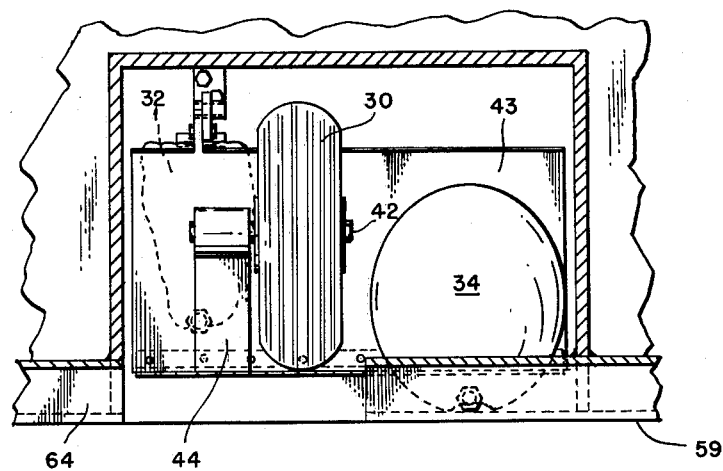
FIGURE 7 is a cross-sectional view taken along the line 7—7 of FIGURE 5 and showing the main wheel in its retracted position.
Figure 8:
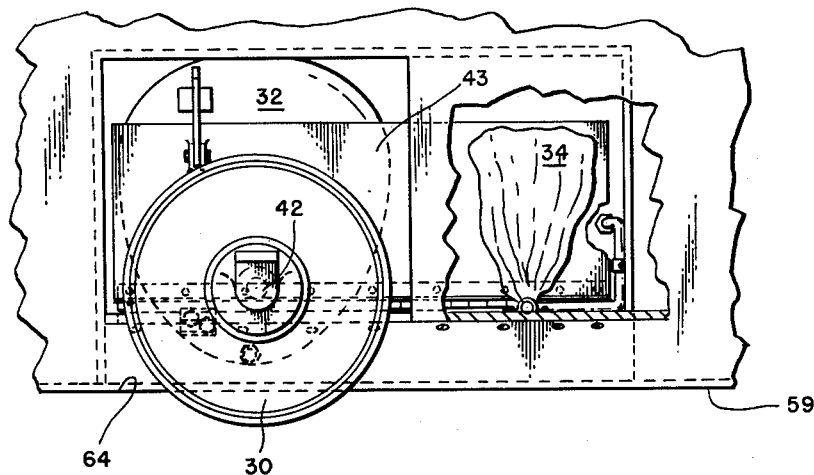
FIGURE 8 is a longitudinal elevation sectional view with certain parts broken away showing one of the front landing wheels as taken along the line 8—8 of FIGURE 3.
Figure 9:
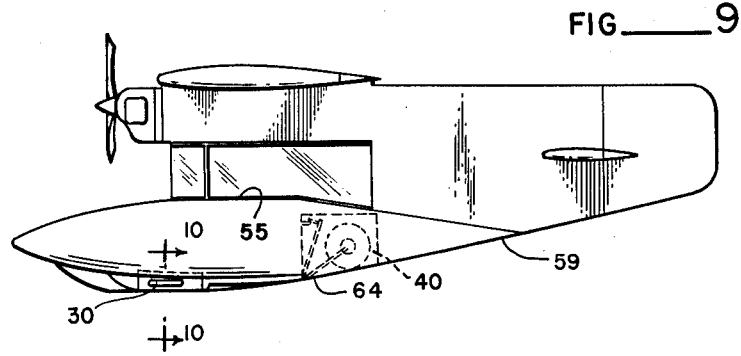
FIGURE 9 is a complete side elevation of the same type of plane as shown in FIGURE 1 but illustrating the entire fuselage to more fully show its construction.

In FIGURES 3 and 4 there is illustrated the forward sponson wheel 30 and if reversed, side for side, the sections would illustrate the sponson wheels 31. Wheels 30 and 31 are supported on axles 42 which in turn are suitably supported from pressure plate 43. The pressure plate is hingedly secured to the fuselage or sponsons of the plane. In FIGURES 3 and 4 it is contemplated that there will be two bladders employed, the extended or operational position shown in FIGURE 3 in which bladder 32 is employed and in the retracted position or the up position, bladder 32 is collapsed as indicated in FIGURE 4 and a second bladder 34 is employed but operating in the opposite sense from bladder 32. This relationship will probably be more readily understood from a study of FIGURE 7. Here, wheel 40 is shown in the up position with bladder 39 extended and working against the pressure plate 52. This pressure can be exhausted after the wheel is retracted since it is then latched in position as shown in FIGURES 4, 5 and 8. As shown in FIGURE 4, wheels 30 and its opposite companion wheel, not shown, are being used as rotary bumpers in which position they serve very well. In FIGURE 7 bladder 38 is shown as deflated. In FIGURE 8 the wheel 30 is shown in its land operational position in which bladder 32 is filled and bladder 34 is deflated. In FIGURE 8 certain parts have been broken away to better show bladder 34 which normally would be obscured by the hull. In considering the showing of FIGURE 4, the latch or holding means 46 is illustrated in its latched position in which wheel 30 or its companion wheel 31 is held in the flying position. The positioning of the parts of latch 46 however, are such that the first action in inflating bladder 32 will be to release the latch so that the wheel can be revolved as bladder 32 is filled.

Referring to FIGURES 5 and 6, one preferred mounting of the main wheel 40 is shown. In FIGURE 5 this is in its retracted position in which bladder 39 is inflated and would normally hold the weight of the wheel until latch member 48 is engaged in the shelf member 49. In this case the operational positioning bladder 38 is deflated. The air supply and exhaust lines 19 and 20 are shown as broken away.

As an illustrative general example, air is supplied to bladders 32, 36 and 39 by air line 20 and bladders 34, 35 and 38 by air line 19. When required the air is exhausted through these same air lines as described above, through valves 21 or 23 depending upon whether the wheels are being retracted or extended.

Wheel 40 is supported upon an axle 50 which is supported by arm 51 and which in turn, is secured to the pressure plate 52 which plate is pivoted at 54 to the hull of the plane. It will be noted that a portion of latch 48, indicated at 48a, serves to engage bladder 38 and to release the latch from shelf 49 when bladder 38 is filled with air during the operation of putting the wheel 40 in operational position and holding it in that position. FIGURE 6 illustrates the operational position of wheel 40 and shows bladder 38 as fully extended with bladder 39 deflated through its combined supply and exhaust line 20.

Figure 2A:
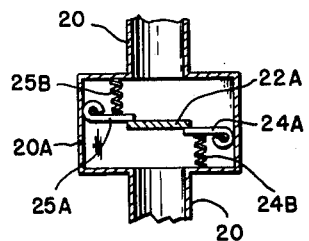
FIGURE 2a is an enlarged view of the restricter indicated generally at 20a in FIGURE 2.

Referring to FIGURE 2A, an auxiliary valve or restricter 20A is employed to insure simultaneous extension of the landing gear. This valve has a body 20A with opposed sections of pipe 20. A central baffle 22A is provided as a rest for the oppositely pivoted dampers 24A and 25A. Springs 24B and 25B normally close the dampers against predetermined air pressures.

Valve 21 in line 19 opens the flow of air within line 19 and valve 23 in line 20 is closed preventing flow in pipe 20. The system is now stopped; no air can leave the auxiliary bladders 32, 36 and 39 and air can be pumped into the main or working bladders 34, 35 and 38.

To extend the landing gear (assuming conditions of gear up and locked) pressure is built up on the gear extending bladders 34, 35 and 38 to extend and position the landing wheels by the action of bellows 14. This has the immediate effect of opening latches 48 and unlocking the three landing gear wheels. As air fills and expands the working bladders it forces out gear carriers 51, as shown in FIGURES 5 and 6, thereby extending the landing gear to its operational position for landing. This action is resisted by the retracting bladders 32, 36 and 39 to an extent determined by the set pressure point of the restricter 20A, which single restricter is common to all auxiliary bladders. This restricter has two purposes; one to hold enough back pressure on the pressure plates 52A, 43 and 52 so that the main or working bladders may open all locks 48 before any one of the carriers start to swing out. Second, this back pressure causes all carriers 51 to extend simultaneously, which on aircraft is highly desirable if not mandatory. When the main line and working bladder pressure reach a predetermined pressure the landing gear is extended and the extending bladders will support all normal landing and ground roll shocks.

At this point the aircraft may be safely landed. However, it is recommended that valve 23 be in its closed positions before landing, as this positively traps air in the retracting bladders, due to the retracting line 20 being closed. This trapped air or partially inflated condition of the auxiliary bladders insures that they act as buffers or elastic stops to any rebounding action of the landing gear carrier.

To retract the landing gear the auxiliary or retracting line valve 23 is opened and the extending valve 21 is open to the atmosphere. Pressure is built up on the auxiliary bladders 32, 36 and 39 by the action of the bellows 14 and moves the carriers 51 in, retracting the landing gear wheels and forcing air out of the main or working bladders 34, 35 and 38 through atmospheric exhaust valve 21 and pipe 24 associated therewith.

Figure 10:
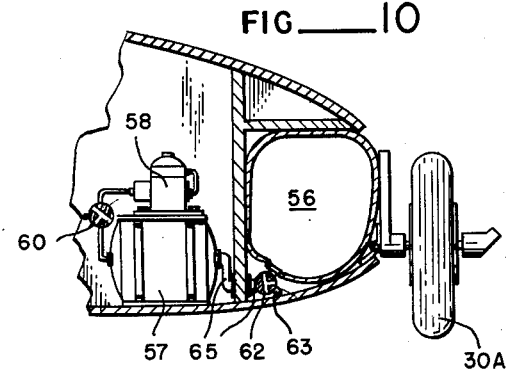
FIGURE 10 is a cross-sectional view, taken substantially along the line 10—10 of FIGURE 9 and illustrating one of the forward landing wheels in operational landing position and further showing an accumulator arrangement, for supplying a sufficient amount of air under higher than usual pressure but which should operate the equipment throughout any normal landing operation.
Figure 11:
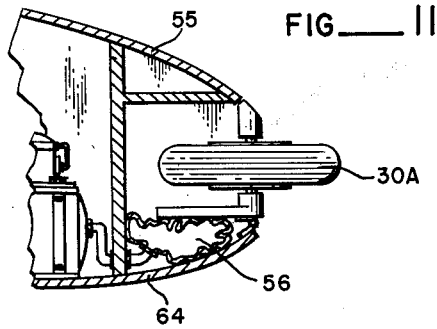
FIGURE 11 is a view taken along the same line 10—10 of FIGURE 9 but showing a forward landing wheel in its flying position or fending position.
Figure 12:
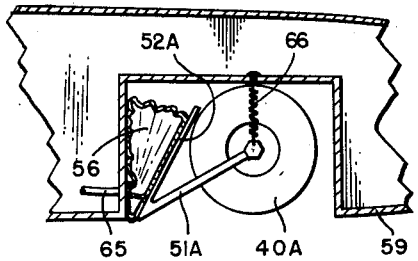
FIGURE 12 is a longitudinal sectional view through the rear landing wheel showing the same in its retracted of flying position and showing a simplified means employing a simple air bladder for positioning the wheel and a tension retracting means.
Figure 13:
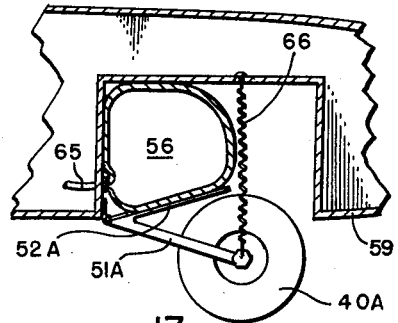
FIGURE 13 is a view similar to FIGURE 12 but showing the same parts in an extended or earth landing position.

In FIGURES 10 through 13 there is illustrated a simplified bladder operation means using the single bladder 56 which might be served by the general operational arrangement of FIGURE 2 if resilient restoring means were substituted for bladders 32, 36 and 39. In the modified form illustrated the single bladder may if desired be served from an accumulator tank 57 which may have its pressure built up by suitable mechanical or electrical pumping arrangement 58. A suitable control valve is provided at 60 so that air may be exhausted from the accumulator system. By the use of valve 62 air may be exhausted from bladder 56 in the case of FIGURES 10 and 11 and 56A of FIGURES 12 and 13 without losing any of the pressure built up in accumulator 57. In this instance the exhaust line 63 passes preferably through the bottom surface of the sponson indicated at 64. The apparatus arrangements shown in FIGURES 10 and 11 are to be equipped with retracting springs or other retracting devices such as shock cord and the like, not illustrated in these figures. These are indicated at 66 in FIGURES 12 and 13. This arrangement holds the wheel 30a or 40a in their different positions, normally in the retracted position, and when the wheel is put into use after the showing of FIGURE 13, bladder 56 must actually overcome the tension of spring 66 as well as to provide sufficient backing for the wheels so that they can take the shock of landing and support the plane or boat. In FIGURES 12 and 13 the supporting arm has been designated as 51a as it is similar in all respects to the arm 51 of FIGURES 5 and 6 and the backing board 52A is similar to the backing board 52 of the same FIGURES 5 and 6.

Throughout the various figures the lower surface of the sponson has been indicated by the reference character 64 and the lower surface of the fuselage which would normally carry the single rear wheel has been indicated as 59. The top surface of the sponsons has been indicated at 55.

It is believed that it will be clearly apparent from the above description and the disclosure in the drawings that the invention comprehends a novel construction of manually operated landing gear for light amphibious airplanes.

Having thus disclosed my invention, I claim:

1. A retractable landing gear for an amphibious airplane, comprising: (a) a landing gear well in the under portion of the hull of said airplane, (b) a carrier means pivotally secured in said well, said carrier means being provided with a landing wheel axle and a landing wheel on said axle, (c) a pressure plate means secured to said carrier means near said pivotal connection and extending substantially across and confined generally within its respective well, (d) an inflatable and deflatable extending bladder means located in said well on the inner side of said pressure plate means and an inflatable and deflatable retracting bladder means located in said well on the outer side of said pressure plate means, and (e) means for supplying and controlling fluid to one of said bladder means and exhausting fluid from the other of said bladder means for raising and lowering the landing gear in said well.

2. The landing gear according to the structure of claim 1, and in which the free edge of said pressure plate carries a pivotal catch member and in which a shelf member is located on a wall of said well for engaging said catch member and holding said pressure plate, carrier and wheel in their retracted position.

3. The landing gear according to the structure of claim 1, and in which said means for supplying and controlling fluid includes a pressure source and a first line branching to each extending bladder and a second line branching to each retracting bladder, said first and second lines being connected to said pressure source and having control valves therein, said retraction line also having a restrictor valve means therein.

4. A retractable landing gear for an amphibious airplane, comprising: (a) a landing gear well in the under portion of the hull of said airplane, (b) a carrier means pivotally secured in said well, said carrier means being provided with a landing wheel axle and a landing wheel on said axle, said carrier means being capable of pivoting out of said well to extend said wheel and of pivoting into said well to retract said wheel, (c) a pressure plate means secured to said carrier means near said pivotal connection and extending substantially across and confined in its respective well, (d) an inflatable and deflatable extending bladder means located in said well on the inner side of said pressure plate means and an inflatable and deflatable retracting bladder means located in said well on the outer side of said pressure plate means, and (e) means for supplying and controlling fluid to one of said bladder means and exhausting fluid from the other of said bladder means for raising and lowering the landing gear in said well.

5. The landing gear according to the structure of claim 4, and in which the free edge of said pressure plate carries a pivotal catch member and in which a shelf member is located on a wall of said well for engaging said catch member and holding said pressure plate, carrier and wheel in their retracted position.

6. The landing gear according to the structure of claim 4, and in which said means for supplying and controlling fluid includes a pressure source and a first line branching to each extending bladder and a second line branching to each retracting bladder, said first and second lines being connected to said pressure source and having control valves therein, said retraction line also having a restrictor valve means therein.

7. Retractable landing gear for an amphibious airplane, comprising: (a) a plurality of landing gear wells in and in close proximity to the under portion of the hull of said airplane, (b) a carrier means pivotally secured in each of said wells, each of said carrier means being provided with a landing wheel axle and a landing wheel on said axle, said carrier means being capable of pivoting out of said well to extend said wheel and of pivoting into said well to retract said wheel, (c) a pressure plate means secured to each of said carrier means near said pivotal connection and extending substantially across its respective well, (d) an inflatable and deflatable extending bladder means located in each well on the inner side of said pressure plate means and an inflatable and deflatable retracting bladder means located in each well on the outer side of said pressure plate means, and (e) means for supplying and controlling fluid to one of said bladder means and exhausting fluid from the other of said bladder means for raising and lowering the landing gear in each of said wells.

8. The landing gear according to the structure of claim 7, and in which the free edge of said pressure plate carries a pivotal catch member and in which a shelf member is located on a wall of said well for engaging said catch member and holding said pressure plate, carrier and wheel in their retracted position.

9. The landing gear according to the structure of claim 7, and in which said means for supplying and controlling fluid includes a pressure source and a first line branching to each extending bladder and a second line branching to each retracting bladder, said first and second lines being connected to said pressure source and having control valves therein, said retraction line also having a restrictor valve means therein.

10. Retractable landing gear for an amphibious type airplane, comprising: (a) a plurality of landing gear wells in and in close proximity to the under portion of the hull of said airplane, (b) a generally flat pressure plate means pivotally secured along one edge to a wall in each of said wells, said pressure plate means extending substantially across and confined to its respective well, (c) a wheel carrier means secured on the outer side of each of said pressure plate means near said pivotal connection, said carrier means being provided with a landing wheel axle and a landing wheel on said axle, said carrier means being capable of pivoting out of said well to extend said wheel and of pivoting into said well to retract said wheel, (d) an inflatable and deflatable extending bladder means located in each well on the inner side of said pressure plate means and an inflatable and deflatable retracting bladder means located in each well on the outer side of said pressure plate means, and (e) means for supplying and controlling the flow of fluid to one of said bladder means and exhausting fluid from the other of said bladder means for raising and lowering the landing gear in each of said wells.

11. The landing gear according to the structure of claim 10, and in which the free edge of said pressure plate carries a pivotal catch member and in which a shelf member is located on a wall of said well for engaging said catch member and holding said pressure plate, carrier and wheel in their retracted position.

12. The landing gear according to the structure of claim 10, and in which said means for supplying and controlling fluid includes a pressure source and a first line branching to each extending bladder and a second line branching to each retracting bladder, said first and second lines being connected to said pressure source and having control valves therein, said retraction line also having a restrictor valve means therein.

13. A retractable landing gear for an amphibious airplane, comprising: (a) a plurality of landing gear wells in and in close proximity to the under portion of the hull of said airplane, (b) a carrier means pivotally secured in each of said wells, each of said carrier means being provided with a landing wheel axle and a landing wheel on said axle, (c) a pressure plate means secured to each of said carrier means near said pivotal connection and extending substantially across its respective well, (d) an inflatable and deflatable extending bladder means located in each well on the inner side of said pressure plate means and a resilient retracting means located in each well and connected to the pressure plate means, and (e) means for supplying and controlling fluid flow to said extending bladder means for raising and lowering the landing gear in each of said wells.

References Cited in the file of this patent

UNITED STATES PATENTS

| | | |
|---|---|---|
| 2,964,271 | Strawn | Dec. 13, 1960 |
| 3,004,737 | Boyle et al. | Oct. 17, 1961 |

FOREIGN PATENTS

| | | |
|---|---|---|
| 604,223 | Great Britain | June 30, 1948 |